United States Patent Office 2,847,707
Patented Aug. 19, 1958

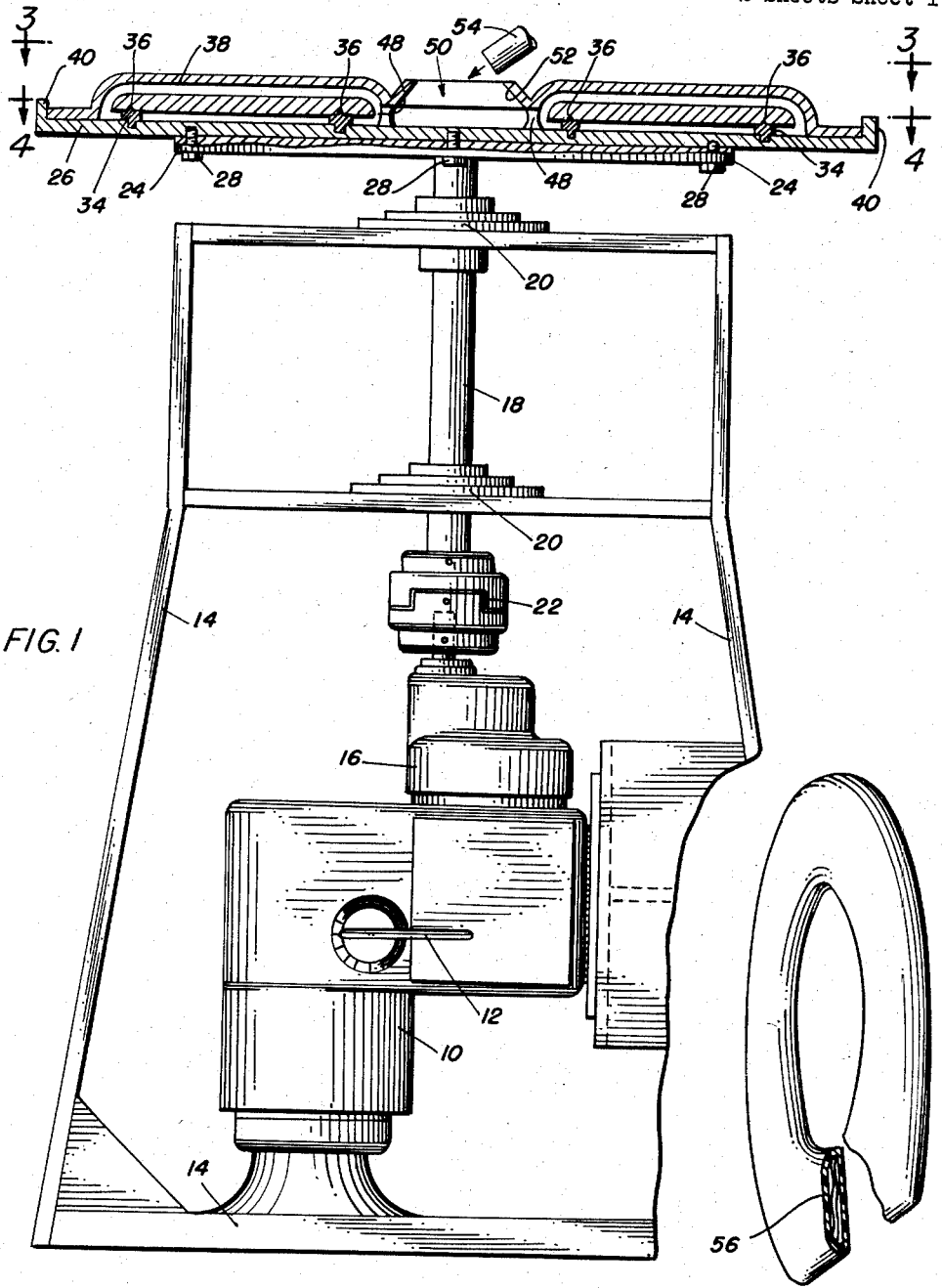

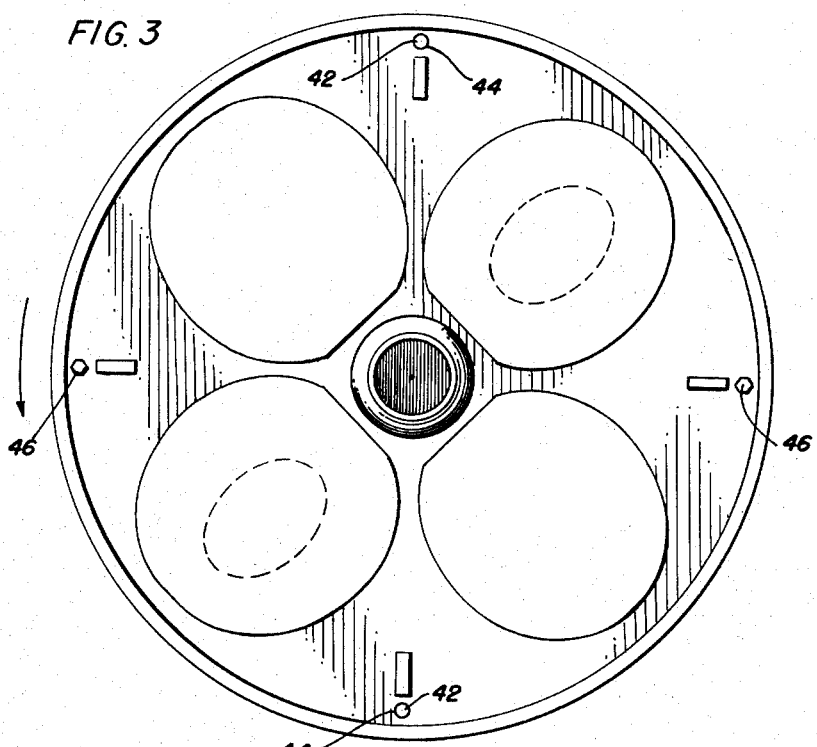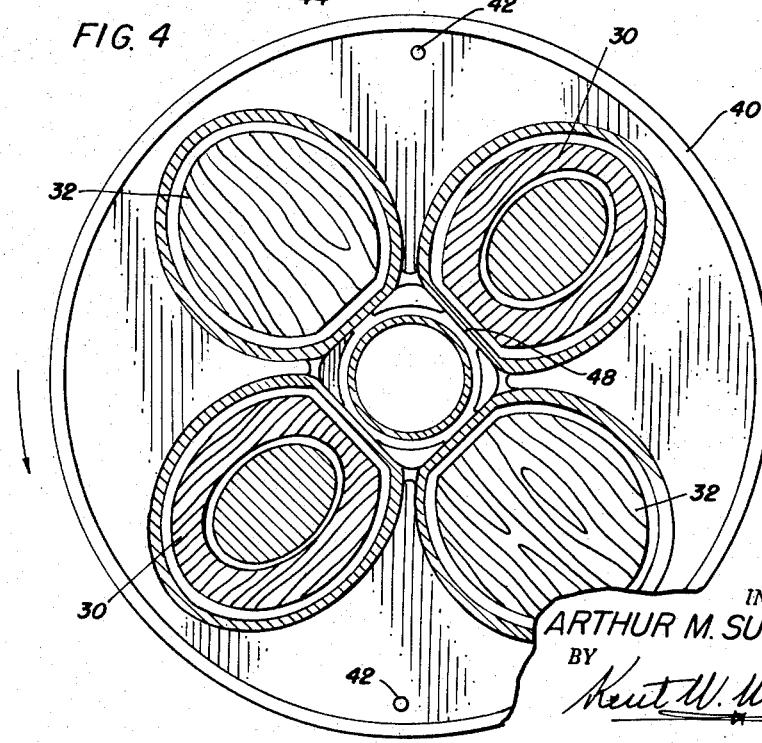

2,847,707

APPARATUS FOR ENCAPSULATING ARTICLES IN A PLASTIC COATING

Arthur M. Sullivan, Downers Grove, Ill., assignor to Walter J. Maker, La Grange, Ill.

Application January 23, 1956, Serial No. 560,733

3 Claims. (Cl. 18—26)

This invention relates in general to the apparatus for completely enclosing an article in a plastic coating and is more particularly described as it relates to the covering and protection of wooden or sawdust type closet seats and covers from wear and deterioration by encapsulating them with a heavy, void-free plastic coating. In addition to the protection such a coating adds decoration and beauty to the enclosed articles.

Closet seats as previously manufactured of wood or molded from sawdust and wood flour require multiple coats of lacquer or enamel for protective purposes. These protective coatings even in multiple application offer only limited protection. They are usually applied in one, two or three mil thicknesses and in most cases, the coatings are of such minute film thickness, that they are susceptible to chipping, thus exposing the articles which they cover to swelling, splintering and darkening color. The coatings may have a tendency to check a crease as a result of which they loose their protective efficiency. Wood has a tendency to deteriorate by swelling when moisture absorption is relatively high and a tendency to splinter and dent easily upon impact. In most instances, the wooden or sawdust type closet seats have coarse and irregular surfaces which are not rendered smooth by multiple coats of lacquer and enamel.

Many attempts have also been made to enclose such products by dipping them in thixotropic plastic compositions with 100% resin solids in which no volatile solvents are present. Such products have also been suspended in split molds and covered with plastic compositions. In all of these instances, it has been difficult to obtain a smooth coating which was free of entrapped air.

An important object of the present invention is to provide a uniform, void-free plastic coating over a wooden or sawdust-type of closet seats and covers by a novel encapsulating process employing centrifugal forces.

Another object of the invention is to provide in one coating or encapsulation, a relatively thick coating which may be one-thirty-second, one-eighth or even one-fourth of an inch thick.

A further object of this invention is to provide apparatus for applying such heavy coatings in inexpensive tooled molds rapidly and economically.

Other objects of the invention will appear in the specification and will be apparent from the accompanying drawings in which, Fig. 1 shows an elevation of a spinner assembly in connection with an encapsulating molding apparatus in accordance with this invention which is shown in section.

Fig. 2 is a perspective view partly broken away of a seat as formed by this method and apparatus.

Fig. 3 is a plan view of the molding apparatus as taken on the line 3—3 of Fig. 1 and Fig. 4 is a sectional view of the apparatus as taken on the line 4—4 of Fig. 1.

The advantages of coated articles of this kind are many: they have good hardness, toughness and impact resistance, resistance to scuffing and staining, protection from water and chemicals, excellent adhesion and superior color retention in clear and pigmented coatings.

Referring now more particularly to the drawings, a spinner is shown in Fig. 1 which comprises an engine or a motor 10 capable of various speeds which may be varied by a speed controller 12 mounted in a suitable supporting frame 14 and having a connected reduction gearing 16 if desired. A vertical shaft 18 is mounted in bearings 20 in the upper portion of the frame 14 which may be connected at its lower end through a flexible coupling 22 with the reduction gearing.

Secured to the top of the shaft is a supporting plate 24 to which a bottom mold part 26 is removably secured in any desirable manner as by means of stud bolts 28.

In the bottom mold part are fastened two wooden or molded sawdust core closet seats 30 and two covers 32. The cores are each fastened in four or more places by spacing plugs 34 having pointed tips 36 which extend into the cores and the plugs are of such dimensions as to space the cores a predetermined distance from the bottom mold part 26, and also from the top mold part 38 which is placed on top of the bottom mold part. The spacing is such that when the top mold part is placed over the bottom part 26, there is a spacing void or clearance around all portions of the cores. This distance may be one-eighth, one-sixteenth or more depending upon the thickness of the coating desired any may be varied in thickness at different locations by properly proportioning the mold parts.

The mold parts and the cores are spaced evenly about the geometric center or axis of the shaft and the equipment is dynamically balanced to eliminate any excessive vibrations during the spinning encapsulation process. Two seat cores are placed diametrically opposite each other and two cover cores are likewise placed oppositely between the seat cores.

At the outer edge of the bottom mold part is an upstanding lip 40 with guide pins 42 to engage in guide openings 44 in the top mold part 38 for positioning the mold parts accurately together and holding them in place. If desired or necessary, fastening bolts 46 may be inserted through the outer mold part 38 into the bottom mold part 26 for holding the parts more tightly together during the molding operation. Handles are commonly provided at opposite portions of the top mold part for placing it in position and removing it.

A liquid-tight seal is maintained between the top and bottom mold parts in all places except those portions of the mold which are nearest the axis or geometric center. At these locations, a port of entry opening 48 is provided for each of the mold units to be enclosed. Around the center of the outer mold part is a pouring opening 50 formed by a central circular flange 52 which is inclined inwardly and peripherally to meet the port of entry openings 48 for each mold unit. After the molding parts and the cores are set up in this manner for the different units, a plastic material is introduced through the central opening 50 in any desired manner as represented, for example, by a discharge pipe 54 and the molding parts are rotated by the motor 10 at any desired speed. A satisfactory speed is 300 revolutions per minute which causes plastic material 56 to be forced centrifugally to the outermost part of the mold filling the mold units from the outermost radial parts to the openings 48.

During the operation of rotation, four and one-half pounds of the following mixture of ingredients is poured slowly through the opening 50:

80% Glidpol 1001 rigid polyester resin
10% Glidpol 2002 flexible polyester resin
10% Titanium dioxide white pigment This mixture is catalyzed with 1.0% cobalt naphthenate containing 6.0% cobalt and 2% methyl ethyl ketone peroxide solution containing 60% peroxide in dimethyl phthalate. The polyester resins are prepared from polyhydric alcohols and ethylenically-unsaturated polycarboxylic acids dissolved in a polymerizable unsaturated monomer namely styrene. Such resins are the Glidpol resins manufactured by The Glidden Company.

The above mentioned quantity of resin is poured slowly through the opening 50 upon the surface of the bottom mold part around its geometrical center. As soon as the catalyzed liquid resin impinges the spinning surface, it begins to spread immediately in a uniform pattern and in a thin layer outwardly from the geometric center. The resin makes its way through the ports of entry 48 filling the void area around each core. During this spreading operation, all air which is occluded in the resin and which is presented in the mold is forced out through the opening 50. The resin fills all of the cavities around the seat 30 and cover 32 cores, thereby completely encapsulating them.

Pouring is continued until each cavity is filled and the excess resin appears flush outside each cavity. The actual pouring normally takes one or two minutes or slightly more, but the spinning may be continued for twelve to fifteen minutes until the liquid resin is transformed into a solid gel. The above example of resins normally gels in approximately ten minutes at 77° F.

When the resin gels, spinning is discontinued and the molded units may be taken with one or both of the mold parts or separately therefrom and placed in an oven at 175° F. for about thirty minutes, thus curing the resin to a hard infusible mass. After complete curing, the encapsulated units are removed from the mold parts (if so included) and from the oven and allowed to cool at ordinary temperature.

In removing each encapsulated unit from the bottom mold part, openings are formed in the coating at the bottom side of the seats of the cover when the unit is disengaged from the spacing plugs 34.

These openings are properly spaced for the insertion of rubber buffer bumper plugs and also for the attachment of the seat or cover through the plastic coating to suitable mounting and pivoting mechanism which forms no part of the present invention.

It is apparent that if desired, heat may be applied directly to the mold by contact strip electrical heaters or by convection, thus curing the plastic coating in the mold during the spinning process.

Although this process is explained in connection with highly desirable products such as toilet seats and covers, many other articles may be similarly encapsulated. Many decorative effects may also be obtained by placing decorative cloth or paper upon or laminating each to the wood or sawdust cores before encapsulation and using a clear unpigmented polyester resin. Various colors and designs are also possible by using pigments to color the resins.

The mold parts for this process may be made from plastics or metals. Metals like aluminum with chrome plating are preferred since they are light-weight which makes them ideal as portable molds. This process lends itself readily to the encapsulation of other products such as wooden bowling pins, wooden golf club heads, capacitors, condensors, transformers, porous metal and alloy castings, and the like.

While a preferred method and apparatus for carrying out this invention is thus described in detail, it should be regarded as an illustration or example rather than as a limitation or restriction of the invention, since various changes in the construction, combination, and arrangement of the parts may be made without departing from the spirit and scope of the invention.

I claim:

1. In an apparatus for encapsulating cores by centrifugal casting, a bottom mold part having an outer rim, means attached to the bottom mold part for rotating it, an upper mold part fitting within the rim of the bottom mold part and having a central opening about the axis of rotation for receiving plastic material, the upper mold part having embossed portions extending from said axis for receiving cores therein, means attached to the bottom mold part for supporting cores between the mold parts in spaced relation thereto, and the upper mold part having recesses communicating with its central opening and leading to each of the embossed portions for receiving and directing plastic material to enclose and adhere to each core.

2. In a centrifugal casting apparatus, a pair of mold parts, means for detachably connecting the mold parts together, means attached to one of the mold parts for rotating them about a transverse central axis, the other mold part having a central opening surrounding the axis of rotation and embossed portions extending radially with port openings therefrom to the central opening, spacing means attached to the first mold part, cores being inserted between the mold parts and held by said spacing means with a predetermined clearance entirely surrounding and enclosing each of the cores within the mold parts except for said spacing means, and means for directing a thermoplastic material through said central opening into the embossed portions around, adhering to, and enclosing the cores as the mold parts are rotated.

3. An apparatus for encapsulating cores by centrifugal casting comprising a flat bottom mold part having a projecting marginal rim on one side, means engaging the other side of the part for operatively rotating it, an upper mold part fitting removably within the rim for rotation with the bottom mold part and having a central pouring opening at the axis of rotation, the upper mold part having embossed portions extending radially from the central opening and away from the bottom mold part shaped to receive core parts freely therein, means attached to one of the mold parts for supporting a core between the mold parts with space between all parts of the core and the adjacent portions of the parts, means for holding the top part in position rotationally with respect to the bottom part, means between the parts forming discharge openings from said central opening of the top part to each of the embossed portions, a flange inclined centrally from the outer edge of said central pouring opening and outwardly beyond the inner side of the embossing of said upper mold part to receive and retain plastic material fed to the mold through said central opening as the mold parts are rotated.

References Cited in the file of this patent

UNITED STATES PATENTS

| | | |
|---|---|---|
| 2,370,953 | Greenberg | Mar. 6, 1945 |
| 2,448,640 | Weston | Sept. 7, 1948 |
| 2,454,847 | Slack | Nov. 30, 1948 |
| 2,557,971 | Jacklin | June 26, 1951 |
| 2,633,605 | Brucker | Apr. 7, 1953 |
| 2,747,230 | Magnus | May 29, 1956 |